(12) United States Patent     (10) Patent No.:   US 12,570,079 B2

Puthanparambil       (45) Date of Patent:   *Mar. 10, 2026

---

(54) EXTRUDABLE ANTIFOG COPOLYESTER HEAT SEAL RESINS

(71) Applicant: Bostik, Inc., Wauwatosa, WI (US)

(72) Inventor: Deepa Puthanparambil, Wauwatosa, WI (US)

(73) Assignee: Bostik, Inc., Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,255

(22) Filed: Sep. 18, 2023

(65) Prior Publication Data

US 2024/0001659 A1     Jan. 4, 2024

Related U.S. Application Data

(63) Continuation of application No. 17/665,720, filed on Feb. 7, 2022, now Pat. No. 11,806,971, which is a continuation of application No. 16/474,126, filed as application No. PCT/US2018/013114 on Jan. 10, 2018, now Pat. No. 11,273,627.

(60) Provisional application No. 62/444,971, filed on Jan. 11, 2017.

(51) Int. Cl.

| | |
|---|---|
| *B32B 27/20* | (2006.01) |
| *B29C 48/00* | (2019.01) |
| *B29C 48/08* | (2019.01) |
| *B29C 48/21* | (2019.01) |
| *B29C 48/28* | (2019.01) |
| *B29C 48/40* | (2019.01) |
| *B29D 7/01* | (2006.01) |
| *B29K 67/00* | (2006.01) |
| *B29K 105/00* | (2006.01) |
| *B32B 27/36* | (2006.01) |
| *B32B 37/06* | (2006.01) |
| *B32B 37/15* | (2006.01) |

(52) U.S. Cl.

CPC ............ *B32B 27/20* (2013.01); *B29C 48/022* (2019.02); *B29C 48/08* (2019.02); *B29C 48/21* (2019.02); *B29C 48/28* (2019.02); *B29C 48/40* (2019.02); *B29D 7/01* (2013.01); *B32B 27/36* (2013.01); *B32B 37/153* (2013.01); *B29K 2067/00* (2013.01); *B29K 2105/0005* (2013.01); *B29K 2995/0026* (2013.01); *B32B 37/06* (2013.01); *B32B 2250/02* (2013.01); *B32B 2255/10* (2013.01); *B32B 2264/102* (2013.01); *B32B 2307/744* (2013.01); *B32B 2367/00* (2013.01); *B32B 2377/00* (2013.01); *B32B 2439/70* (2013.01)

(58) Field of Classification Search

CPC ....... B29C 48/022; B29C 48/08; B29C 48/21; B29C 48/28; B29D 7/01; B32B 37/153; B32B 37/06; B32B 2367/00; B29K 2067/00; B29K 2105/0005; B29K 2995/0026

See application file for complete search history.

(56) References Cited

U.S. PATENT DOCUMENTS

| | | |
|---|---|---|
| 3,371,947 A | 3/1968 | Gridley |
| 4,165,210 A | 8/1979 | Corbett |
| 4,375,494 A | 3/1983 | Stokes |
| 5,482,769 A | 1/1996 | Schirmer |
| 5,520,764 A | 5/1996 | Toney et al. |
| 5,614,297 A | 3/1997 | Velazquez |
| 5,744,181 A | 4/1998 | Sornay ............... B65D 77/2024 |
| | | 426/106 |
| 5,792,808 A | 8/1998 | Sobuttka ................... C08K 3/32 |
| | | 524/450 |
| 6,444,283 B1 | 9/2002 | Turner et al. |
| 6,455,142 B1 | 9/2002 | Heberger et al. |
| 6,923,997 B2 | 8/2005 | Patchen |
| 6,939,584 B2 | 9/2005 | Sankey et al. |

(Continued)

FOREIGN PATENT DOCUMENTS

| | | |
|---|---|---|
| CN | 1884371 A | 12/2006 |
| CN | 102558978 A | 7/2012 |

(Continued)

OTHER PUBLICATIONS

JP—Application No. 2019-537139—OA—Notice/Reason for Rejection, Mailing Date Nov. 2, 2021 Mailing No. 706587—Reference No. F191081US1.

(Continued)

*Primary Examiner* — Michael C Miggins

(74) *Attorney, Agent, or Firm* — Christopher R. Lewis

(57) ABSTRACT

A semicrystalline copolyester resin composition formed by twin screw extrusion of various ingredients includes copolyester resins, antiblock, slip and antifog additives. This semicrystalline copolyester resin can be extruded on to PET film or coextruded with PET resin to form clear PET films with antifog properties. These films with antifog properties are produced in a single step without the use of solvent and does not involve any secondary step for coating a separate antifog layer. This minimizes the cost and time required by a converter to make such clear antifog films. These films containing the heat seal copolyester resin can be heat sealed to clear APET trays. Contents within the trays, such as food, can be seen without fogging on the inside of the film that is used to seal the tray. The seals are strong and the peels are smooth giving a very good packaging performance.

19 Claims, No Drawings

(56)                  References Cited

U.S. PATENT DOCUMENTS

| | | | |
|---|---|---|---|
| 7,384,684 | B2 | 6/2008 | Konrad et al. |
| 7,413,800 | B2 | 8/2008 | Wood, Jr. .............. B32B 37/153 |
| | | | 428/323 |
| 7,700,187 | B2 | 4/2010 | Konrad et al. |
| 7,714,048 | B2 | 5/2010 | Goino et al. |
| 8,129,007 | B2 | 3/2012 | Forloni |
| 8,557,384 | B2 | 10/2013 | Zhao et al. |
| 2003/0148113 | A1 | 8/2003 | Chen |
| 2004/0058174 | A1 | 3/2004 | Kurian et al. |
| 2005/0079372 | A1 | 4/2005 | Schmal et al. |
| 2005/0208282 | A1 | 9/2005 | Wood et al. |
| 2005/0249906 | A1 | 11/2005 | Sankey et al. |
| 2007/0077399 | A1 | 4/2007 | Borowiec et al. |
| 2011/0163101 | A1 | 7/2011 | Deng |
| 2012/0101201 | A1 | 4/2012 | Townsend ............ C10M 129/40 |
| | | | 524/232 |
| 2013/0224411 | A1 | 8/2013 | Montcrieff et al. |
| 2014/0234493 | A1* | 8/2014 | Forloni ...................... C09J 7/35 |
| | | | 426/113 |
| 2015/0275032 | A1 | 10/2015 | Deak et al. |
| 2016/0236449 | A1 | 8/2016 | Lee et al. |

FOREIGN PATENT DOCUMENTS

| | | | |
|---|---|---|---|
| CN | 202742776 | U | 2/2013 |
| EP | 2682419 | A1 | 1/2014 |
| JP | 2001328221 | A | 11/2001 |
| JP | 2003183483 | A | 7/2003 |
| JP | 2004268940 | A | 9/2004 |
| JP | 2004307769 | A | 11/2004 |
| JP | 200655029 | A2 | 3/2006 |
| JP | 2006255931 | A | 9/2006 |
| JP | 200731545 | A2 | 2/2007 |
| JP | 20101384 | A2 | 1/2010 |
| JP | 2015218211 | A2 | 12/2015 |
| KR | 1020060109623 | A | 10/2006 |
| KR | 100933853 | B1 | 12/2009 |
| WO | 2015046132 | A1 | 9/2014 |

OTHER PUBLICATIONS

JP—Application No. 2019-537139—OA—Notice/Reason for Rejection, Mailing Date Nov. 2, 2021 Mailing No. 706587—Reference No. F191081US1 (Translation Copy).

JP—Third Party Submission of Observation—Sep. 21, 2021—Commissioner of Japan Patent Office, JP Patent Application No. 2019-5157139.

Eastapak Polymer 9921 Technical Data Sheet (Eastman Chemical Company) May 25, 2011 (May 25, 2011); pp. 1-4; p. 1 pellet property.

Kemamide E Safety Data Sheet (HB Chemical Corporation) Nov. 17, 2014 (Nov. 17, 2014); pp. 1-6; section 1, section 9.

Machida et.al., The effect of $SiO_2$ addition in super-hydrophilic property of $TiO_2$ photocatalyst, Journal of Materials Science 34 (1999), pp. 2569-2574, 1999 Kluwer Academic Publishers.

Min Nie et al., Superhydrophilic Anti-Fog Polyester Film by Oxygen Plasma Treatment, Nano/Micro Engineered and Molecular Systems, 2009 4th IEEE International Conference on Jan. 5-8, 2009, pp. 1017-1020.

* cited by examiner

EXTRUDABLE ANTIFOG COPOLYESTER HEAT SEAL RESINS

CROSS-REFERENCE TO RELATED APPLICATIONS

This application is a continuation application under 35 U.S.C. § 120 of U.S. patent application Ser. No. 17/665,720, filed on Feb. 7, 2022 which is a continuation of U.S. patent application Ser. No. 16/474,126, filed on Jun. 27, 2019 (now U.S. patent Ser. No. 11/273,627, issued Mar. 15, 2022) which is a U.S. national stage application under 35 U.S.C. § 371 of PCT/US2018/013114, filed Jan. 10, 2018, which claims the benefit under 35 U.S.C. § 119 to U.S. Provisional Patent Application No. 62/444,971, filed Jan. 11, 2017.

FIELD OF THE INVENTION

This invention relates to copolyester resin compositions capable of forming clear heat seal coatings used for polyester films and having antifog, slip, and antiblock ability. The invention also relates to methods for applying such compositions to polyester films.

BACKGROUND OF THE INVENTION

Coated polyester films with heat seal layers are used to package food products and consumer goods. In one common application, the heat seal polyester (PET) films are run on high speed food packaging machines. The film is typically coated or coextruded with heat seal resin/film on one surface of the web. This web is fed through the machine for packaging food and other consumer goods. The film is heat sealed to different packaging substrates such as food containers. This is done with pressure and heat using heated platens. The performance of the seal in terms of strength and package integrity is largely a function of the characteristics of the film, the heat seal layer, tray stocks to which they are sealed as well as machine operating conditions such as platen temperature, pressure, and dwell time. Since these films are used in food packaging, it is desirable that the heat seal coating, as well as the packaging film and tray stocks, be FDA direct food contact compliant (21 CFR § 175.300 and above).

Current technology for heat seal PET films with antifog performance includes films with water-based or solvent-based antifog coatings. This involves several steps in the manufacturing of the antifog PET film. The PET film is formed by extrusion or co-extrusion with the heat seal layer on the film. This film is then rolled and supplied to the next tier or processing site. The rolls are unwound, undergo expensive treatment, including corona treatment (such as described in U.S. Pat. No. 5,520,764) or chemical treatment and then the antifog coating is applied as a solvent based coating or water based coating. This step involves application using expensive equipment, drying, followed by winding the film to be supplied to the next tier.

A number of efforts have been made to provide a heat seal coating for polyester film. W.O. Patent Application No. 2014006205 A1 describes a coated polyester film with antifog for packages of fresh red meat and fish. The application patent explains the formation of the film by coating the polyester film with an antifog additive, which is a cationic polysaccharide with suitable diluents including a solvent. The polyester film with antifog properties is produced in two steps with the use of solvent.

W.O. Patent Application No. 2015046132 describes a multi laminated structure with antifog properties. The patent application describes the formation of a multilaminate structure using four layers, layer A being a polyolefin layer, layer B being an intermediate polyolefin layer with antifog additive kneaded into it, layer C being an acid modified polyolefin layer, and layer D being a polyester heat seal layer kneaded with antifog additive. Layers A and D are treated using expensive treatment techniques to give the final properties, including printing and adhesion. This patent application describes the formation of a heat sealable laminated structure wherein the antifog additive is used in two different layers to achieve the final performance.

China patent application No. CN 102558978 discloses the formation of a transparent antifog PET film by spray coating an antifog solution on to the PET film. The antifog coating comprises PVA mixed with a water soluble solvent followed by the addition of fatty acid ester with hydroxyl group in the presence of water. This solution is then sprayed onto the PET film to provide the transparent antifog film. This patent application describes the formation of the antifog coating as a secondary process in the manufacture of antifog PET film.

JP 2015218211 teaches a polyvinyl chloride resin composition modified with aliphatic polybasic acid-based polyester with a weight average molecular weight of 1,600-3,600 derived from adipic acid, 1,2-propanediol, and n-octanol as end-capping agent and an aliphatic polybasic acid-based ester having plasticizing efficiency≤0.90, epoxidized vegetable oil, and a glycerin-based antifogging agent. It is stated that this composition produces low shrinkage film for food packaging applications.

JP 2010001384 discloses an additive package that could be used with several plastics, including polyethylene, polypropylene, ethylene-vinyl acetate copolymer, vinyl chloride, and polylactic acid to improve the antifog and antistatic properties. The additive added to the resin contains a polyglycerine alkyl ether compound and an anionic surfactant.

KR 2009076233 explains the formation of a biodegradable and anti-fogging sheet having improved scratch resistance while maintaining sufficient flexibility and transparency and continuously exhibiting anti-fogging property. This is formed by melting and extruding the resin and discharging the molten resin through a slip type die to prepare a sheet, wherein the resin comprises a mixture of polylactic resin and aliphatic polyester or aromatic-aliphatic polyester resin. The sheet is then corona treated. An antifogging agent consisting of surfactant, tetrafluoroethylene as a fluorine resin, and water is applied to one surface or both surfaces of the corona discharge treated sheet and the applied coating is dried at 60-100 degrees centigrade hot wind for 10-30 seconds. This patent teaches us the formation of antifog sheet by a secondary coating process.

CN 1884371 and JP 2006055029 explains a biodegradable resin composition which has good transparency, flexibility and weather resistance, is free from the deterioration of the transparency by the bleeding-out of an anti-fogging agent with the passage of time. In other words, the composition has excellent anti-fogging durability. The film or sheet is suitable for agriculture and food packaging. This resin composition comprises a biodegradable polyester resin, an ester of a fatty acid with an alcohol selected from sorbitol, sorbitan, and polyglycerol (including dehydration-condensed alcohols, and polyhydric alcohol alkylene oxide adduct) as the anti-fogging agent, and a sulfonate-based surfactant.

KR 2006109623 teaches the formation of a polyester film with a surface capable of preventing droplets from being formed on the surface of the film by applying a water-dispersed polyurethane resin on at least one surface of the uniaxially oriented polyester film. The film is kept fresh by forming this thin water screen using the water-dispersed polyurethane resin.

JP 2007031545 explains the formation of an antifog coating on to a PET film using a water soluble solution of antifog compounds like sucrose octadecanoate and sodium octadecanoate. The coating was applied on a corona-treated polyester film, dried at 70° to give an antifog sheet, and demonstrates good antifogging property at high temperature, antifogging property retention, and non-stickiness. The process of producing an antifog film comprises two steps.

W.O. patent application no. 2005103160 discloses a composition for a biodegradable film with antifog properties by incorporating the following into a polylactic acid resin. A surfactant and a compatibilizer obtained from reaction of a surfactant $(R^1R^2R^3R^4N^+)_mX^1$ with a (modified)polyhydric alcohol and boric acid, wherein $R^2$, $R^2$, $R^3$, $R^4$=independently linear or branched $C_{1-30}$ alkyl, alkenyl, hydroxyalkyl, alkylaryl, arylalkyl, $(A^1O)_fRa$; $A^1=C_{2-4}$ alkylene; f=1-50; Ra=linear or branched $C_{1-30}$ alkyl, alkenyl, hydroxyalkyl, or alkylaryl; $X^1$=structure having ≥1 $SO_3$ and ≥1 $COOR^7$; m=≥1 integer; $R^7$=linear or branched $C_{1-30}$ alkyl, alkenyl, hydroxyalkyl, alkylaryl, or $(A_2O)Rb$; and Rb=$C_{1-30}$ alkylene. Thus, Lacea H 100 and 1.0% trimethyloctylammonium 1,4-dioctyl sulfobutanedioate were kneaded at 200° and pressed to give a test piece, showing good molecular weight retention, antistatic, and antifogging properties, and haze of 1.5%. Heat sealability of the film is not disclosed.

Min Nie et al., Nano/Micro Engineered and Molecular Systems, 2009. NEMS 2009. 4th IEEE International Conference on 5-8 Jan. 2009, pages 1017-1020, explains the formation of a super hydrophilic polyester film formed by plasma treatment. Super hydrophilic polyester film has been obtained by oxygen plasma treatment to maintain optical clarity under high relative humidity. The original and treated films are simultaneously exposed to the vapor from hot water. The latter keeps its optical clarity because the condensed water formed a thin film on it instead of droplets for the former. Compared with the widely used coating method, plasma treatment to obtain anti-fog polymer film has the potential for mass production, lower cost, better compatibility with thermal extrusion process, and safer for food packaging. Heat sealability of the film has not been explained by the authors.

U.S. Pat. No. 5,520,764A explains the formation of a laminate structure which has an antifog layer as one of the laminate layers. The laminate comprises a first substrate which is a blend of a polyolefin and an antifogging agent, and is coextruded with another polyolefin, preferably an ethylene unsaturated ester copolymer or low density polyethylene. Once coextruded, this layer is corona treated and then bonded to a second substrate comprising polyester or nylon, which could also be corona treated to the bonding side. The formation of this multilaminate structure involves several steps.

US 20030148113 A1 explains the formation of an antifog film on several different substrates, including polyester. The antifog film is formed by using an anti-fog coating composition comprising a silicone polymer or oligomer, a water dispersible polyurethane polymer or oligomer, and water or a co-solvent. The anti-fog film is formed by applying the anti-fog coating composition to a substrate such as polyester and coalescing or crosslinking the silicone and polyurethane compounds to form the film. The applied coating is then suitably heated for certain amount of time to form the antifog network film on the surface of the substrate. This antifog film is formed using polyurethane dispersions and water. The use of isocyanates as well as removal of water during the process is somewhat challenging. Also, depending on the extent of crosslinking, the coated film could be too brittle or low crosslinking can result in chalking, i.e., a powdery film is produced that degrades or disperses upon contact with an aqueous solution or water.

Machida et. al, JOURNAL OF MATERIALS SCIENCE 34 (1999) 2569-2574, describes the formation of a hydrophilic surface by photocatalytic activity of $TiO_2$ with the addition of $SiO_2$. The process helps $TiO_2$ to hold more water during UV irradiation process.

US 20070077399 A1 explain the formation of antifog films for use into making refrigerator doors. The composition of the antifog coating comprises an isocyanate, a hydrophilic polyol, and a hydroxyl bearing surfactant which has a hydrophilic group and a hydrophobic moiety. These components are mixed in organic solvents and applied to substrates including polyester. The coating is then cured with heat and time to form the antifog coating on to the film. This process again involves several steps as well as substantial time and use of unfriendly isocyanate.

CN 202742776 U explains the formation of polyester film with antifog coatings on both sides of the film. The antifogging agent consists of two ingredients. The first ingredient consists of sorbitan fatty acid ester, nonylphenol polyoxyethylene ether, polyoxyethylene sorbitan fatty acid ester, glycerol fatty acid ester, an ethylene oxide-propylene oxide block polymer, a polyoxyethylene alkyl ether or a polyoxyethylene alkylphenyl ether, and the second ingredient called the synergist is selected from the group consisting of poly vinyl alcohol, polyethylene glycol or polyoxyethylene glycol, or a combination of at least two of them. These two ingredients are twin screw extruded with a polyester base material. In another step this functional polyester layer is extruded along with a base polyester layer through the use of a coat hanger die to produce a polyester film through extrusion and lamination process to create a polyester film with antifog properties on both side of the film. Although the invention claims the antifog performance of the film, it does not disclose the heat sealability of the film to various tray stocks. The composition of the base polyester is also not explained very well.

US 20130224411 A1 describes a process for making an antifog film useful for packaging food. The peelable antifog films can be used as lidding films in trays made of amorphous polyester (APET). The films may include at least one base layer or film, such as a polyester film, and a heat seal layer. This base film with a heat seal amorphous layer is produced through a coextrusion process. The antifog layer is then coated on the heat seal layer. The heat seal layer allows the antifog coating to more strongly adhere to the antifog film. The seal strength of this antifog film is reported to be between 500 to 1000 grams per linear inch (gli). The film provides good antifog properties and good bond strength, but the process involves a secondary step for the application of the antifog layer on to the heat seal layer, which is claimed to be an amorphous polyester layer.

WO 2015051375 A1 explains the formation of a peelable antifog multilayer film wherein the peelable antifog layer is added to the inner layer of the multilayer structure as a secondary process.

U.S. Pat. No. 5,614,297 A—refers to a thermoplastic multilayer polymeric flexible film comprising at least one copolymer of ethylene and at least one $C_3$-$C_8$ alpha-olefin within the multilayers. The multilayer comprises a first outer layer, a core layer, and a second outer layer wherein the core layer is between the first and second layers. The film is a slot cast film or a blown film which has at least three layers including a core layer disposed between first and second outer layers. They also report the use of suitable additives such as antifog agents, slip agents, nonionic surfactants, oleamides, and/or fluoroelastomers in the core layer. The invention may be used as an industrial wrap or to wrap, cover, or enclose various non-food or food articles but has particular utility as a food overwrap stretch or cling film. This invention does not report the heat sealability of the film to APET trays.

US 2011/0163101 A1 explains the formation of a heat seal coating containing antifog additives that can be solvent coated onto a biaxially oriented PET film to form a heat seal layer that can then be used to heat seal the PET film on to PLA cup stocks.

U.S. Pat. No. 6,923,997 B2 explains various antifog compositions that can be prepared and solvent sprayed on to food containers to render the container non-fogging. Here again, the use of solvent is imperative for the process.

U.S. Pat. No. 7,700,187 B2 discloses the formation of a hydrophilic antifog coating on a biaxially oriented polyester film. The hydrophilic water dispersion or solution which consists of a sulfopolyester, a surfactant, and optionally an adhesion promoting polymer in water is applied to a corona treated PET film via reverse gravure application followed by drying at 100 deg C. This is a secondary step in the process of making the final antifog film. A similar patent also exists as U.S. Pat. No. 7,384,684 B2 from the same inventors wherein polyvinylpyrrolidone is used instead of the sulfopolyester.

U.S. Pat. No. 8,557,384 B2 discloses a coating composition comprising an alkali metal silicate, a wetting agent, and a hydrophilic antifog agent applied to the surface of a substrate from aqueous dispersion, followed by drying to form the antifog coating on to the film surface.

US Pat. App. No. 20050249906A1 describes the formation of a heat sealable PET film by extruding process, but one which does not incorporate any antifog into the composition of the film. The application discloses the formation of a heat seal layer (0.005 Pa·s to 50 Pa·s viscosity during the process) by melt-coating it on to a biaxially oriented PET film as an in-line process during the manufacture of the film. They also indicate the use of water to help with coating the heat seal layer to the biaxially oriented PET film to improve the adhesion of the heat seal layer during the in-line process.

As can be appreciated from a review of the above, various attempts have been proposed to produce packaging that helps a consumer to see the food clearly through the lidding film. A refrigerated food tray will have a lip extending above the stored food item so that the lidding film covering the top of the tray does not touch most of the packaged food. In this arrangement, the consumer preferably can see clearly through the plastic wrap to view the food item stored in the package. If the lidding film is fogged, it could impair the vision of the food in the tray.

Another attempt would be to reduce the depth of the tray so that the consumer can see the food clearly. This is because of the distinctness of image caused by the deviation of the direction of light propagation from the regular direction by scattering during transmission or reflection while observing the food in the tray. If the lid is fogged up, the vision of the food is impaired.

Another attempt is to wrap the tray containing the food with plastic film that could potentially contain antifog ingredients. In this case, the tray is usually not transparent and the lid is wrapped instead of being sealed to the tray. The package must be opened by destroying the whole plastic film, which undesirably reduces the shelf life of the food. Also, any opening in the wrap can also reduce the shelf-life of the food when stored in grocery store shelves or elsewhere.

More and more consumers would like to see the food in the tray and be able to assess the quality of the food and hence the clarity of the lid becomes very important in the eyes of the consumer. In the past, attempts have provided antifog coatings that could be applied to the heat seal coating. This process involved expensive equipment as well as several steps in the process of manufacturing an antifog lidding material that could be sealed to APET trays. The method involved creating a PET lidding material by coextrusion, extrusion coating or solvent coating. The heat seal layer could be coextruded along with PET to form the heat seal PET film or the heat seal layer could be extruded on to the PET film or solvent coated on to the PET film. This heat seal layer then acted as an anchorage for the next step of antifog gravure coating application. This process was done always as a secondary step in the process of making the antifog heat seal PET film. It involved the use of solvent or water depending on the chemistry of the antifog product. The overall process involves several steps as well as expensive equipment to make the PET film at the converter.

SUMMARY OF THE INVENTION

In contrast to above patents and previous attempts, the present invention is directed to a solvent-free, extrudable or co-extrudable heat seal coating containing an antifog additive and its use by film converters. The heat seal coating can be extruded on to various gauges of PET films or it can be co-extruded along with polyester or copolyester resins to form a converted PET film that exhibits good clarity, antifog, antiblocking, and good bond strength over a wide range of processing temperatures to different tray stocks. Once sealed, the bonds can be opened as a smooth peel without being a weld seal.

According to an embodiment of the invention, a heat seal resin composition for providing a heat seal film on a film, such as a polyester film, comprises: a copolyester resin component comprising a blend of a semi-crystalline copolyester resin and an amorphous copolyester resin; an antifog additive; and an anti-block and slip additive.

According to another embodiment of the invention, a heat seal resin composition for providing a heat seal film on a polyester film consists essentially of, or consists of, a copolyester resin component comprising a blend of a semi-crystalline copolyester resin and an amorphous copolyester resin; an antifog additive; and an anti-block and slip additive. A composition which consists essentially of the listed constituents excludes certain other constituents, such as a solvent.

According to another embodiment of the invention, a method of making a laminate comprises, consists essentially of, or consists of the steps of: forming a heat seal resin composition by mixing a copolyester resin component, an antifog additive, and an anti-block and slip additive in the absence of a solvent; and applying the heat seal resin composition to a film, such as a polyester film, or a film-forming compound, such as polyester, to form the laminate, wherein no solvent is added to the heat seal resin composition before or during the applying step. A method which consists essentially of the listed steps is done in the absence of certain other steps, such as a primer step.

According to another embodiment of the invention, a method of making a package for containing an item comprises the steps of: (1) making a laminate by: (a) forming a heat seal resin composition by mixing a copolyester resin component, an antifog additive, and an anti-block and slip additive in the absence of a solvent and (b) applying the heat seal resin composition to a film, such as a polyester film, or film-forming compound, such as polyester, to form the laminate, wherein no solvent is added to the heat seal resin composition before or during the applying step; and (2) contacting the laminate with an upper lip of a food tray under sufficient heat, pressure, and time to cause the heat seal resin composition to adhere the laminate to the food tray.

This copolyester heat seal resin composition can be used as an extrudable or coextrudable copolyester resin in making heat sealable polyester films capable for use as liddings of food packages. More specifically, the extrudable copolyester resin can be applied to PET films by converters (i.e., PET film producers) to create a clear antifog heat seal layer with slip and antiblock properties using traditional extrudable coating methods. This extrudable copolyester resin can also be coextruded with polyester resin to form a biaxially oriented clear antifog heat seal layer with good slip and antiblock properties. The coated films can be wound into rolls without blocking (i.e., sticking of the laminate together upon rolling) and have good adhesion to many different packaging substrates at medium to high activation temperature. The coated film with antifog properties is peelable when heat sealed to polyester films or polyester tray stocks used to package food. Such heat seal films are conventionally sold in roll form. The rolls are then supplied in roll form for use on form, fill, and seal packaging machines. This can include horizontal form fill seal (HFFS) packaging, manufacture of bags or pouches by vertical form fill seal (VFFS) technology, or as flexible packaging film as a top film for vacuum skin packaging applications.

The present invention reduces the number of steps involved in making the final roll as the copolyester resin includes antifog additives as well as antiblock and slip additives. Hence, the resin can be extruded or coextruded with PET resin or other copolyester resin. The copolyester resin containing the antifog also acts as the heat seal copolyester. So, this reduces the need for two separate steps involved in the manufacture of the final heat sealable antifog PET film. The heat seal layer has the antifog and slip and antiblock additives added in the proper ratio to provide adequate sealability and peelability, good clarity, and good antifog properties. Apart from this, the heat seal layer has minimum blocking so the film can be wound and unwound after the production. The film can be slit for further application in a minimum amount of time. Since the resin does not involve any solvent, there is a reduction in the environmental impact as well as an increase in safety of the workers involved in the use of the resin.

In one aspect, the invention is a formulated copolyester resin which can be extruded on to various gauges of PET film or coextruded with polyester resin to form a heat seal coating on the seal layer of the formed PET film. This film (also referred to herein as a laminate) shows excellent clarity and good antifog so that the tray containing the food when sealed with this PET film shows no fogging. The consumer can see the food even when the tray is placed in the refrigerator. The formulated mixture may be produced in a twin screw extruder by melt blending several ingredients.

DETAILED DESCRIPTION OF THE INVENTION

An embodiment of the invention pertains to a copolyester heat seal resin capable of being extruded on to PET films or coextruded with PET resins to produce a clear heat sealable PET lidding film. This lidding film is then used for packaging fresh produce or food products or other items that could potentially contain water. The usual container for such food products is clear amorphous PET trays. The overall concept of the packaging is to help the consumer see the food in the tray. If there are water droplets or fogging on the surface of the film, the overall effect of the packaging is lost and the consumer satisfaction will be impaired. Fog develops in numerous ways as a result of changing climate or variation in temperature conditions such as freezing or humidity. When warm air, which holds moisture, meets a colder surface, water can condense and settle on to the colder surface. When too much moisture settles, this leads to water accumulation that needs to go somewhere, resulting in fog. The principle behind using anti-fog heat seal resin is to create a hydrophilic surface by altering the degree of wetting on the surface of the film when the heat seal coating is formed. The antifog heat seal layer improves the wettability of the surface and, when this surface attracts and absorbs moisture, it creates a non-scattering or a thin layer of film of water without impeding the vision.

According to an embodiment of the invention, a heat seal resin composition for providing a heat seal film on a polyester film comprises: a copolyester resin component comprising a blend of a semi-crystalline copolyester resin and an amorphous copolyester resin; an antifog additive; and an anti-block and slip additive. It has been found that the combination of semi-crystalline and amorphous copolyesters provide an especially desirable performance for the end use application. The semi-crystalline resin reduces creep and imparts flexibility and elasticity to the heat seal coating, whereas the amorphous copolyester provides added strength and antiblock properties to the overall heat seal coating. The fully formulated heat seal resin will be semi-crystalline co-polyester and may have a low glass transition temperature ($T_g$, determined in accordance with ASTM E1356-08) between about −30° C. and about 15° C., preferably in the range of −20° C. to 10° C., and most preferably between about −15° C. to about 0° C. The fully formulated heat seal resin also may have a ball and ring melt point (determined in accordance with ASTM E28-99) of between about 110° C. and about 170° C., preferably in the range of 120° C. to 160° C. and most preferably between about 130° C. to about 155° C. The fully formulated heat seal resin also may have a DSC melt temperature ($T_m$ determined in accordance with ASTM D7138) of between about 100° C. and about 170° C., preferably in the range of 120° C. to 150° C., and most preferably in the range of 125° C. to 145° C. The fully formulated heat seal resin may also have an intrinsic viscosity (determined in accordance with ASTM D5225-14) of between about 0.4 and about 1.1 dl/g, preferably in the range of 0.5 to 1.0 dl/g, and most preferably in the range of 0.6 and about 0.8 dl/g. The fully formulated heat seal resin also may have an apparent melt viscosity of between about 500 poise and about 3,000 poise determined at 215° C., preferably in the range of 1,000 poise to 2,500 poise, and most preferably in the range of about 1,500 poise to 2,000 poise (determined in accordance with ASTM D3236-15). In a preferred embodiment, the fully formulated heat seal resin has a glass transition temperature of between about −15° C. to about 0° C., a ball and ring melt point of between about 135° C. to about 155° C., a DSC melt temperature in the range of 130° C. to 145° C., an intrinsic viscosity in the range of 0.72 and about 0.86 dl/g, and a melt viscosity of about 1,500 poise to 2,000 poise.

In an exemplary embodiment, the heat seal co-polyester resin is made from a combination of diol and diacid/diester components (with the diacid and diester components being interchangeable), wherein at least one of the diol or the diacid/diester groups have at least two components, e.g. 1 diol and 2 diacids/diesters or 2 diols and one diacid/diester. As for the diol component, standard polyester diol monomers, such as ethylene glycol, diethylene glycol, butane diol (1,4-; 1,2-; and 1,3-), neopentyl glycol, 2-methyl-1,3-propane diol, hexane diol, trimethylolpropane, cyclohexanedimethanol, and tricyclodecane dimethanol, may be used. The diester monomers may include any known diester used in making copolyester resins, such as dimethyl terephthalate or dimethyl isophthalate. The diacid monomers used may include any known diacid used in making copolyester resins, such as terephthalic acid, isophthalic acid, adipic acid, azelaic acid, sebacic acid, and cyclohexanedicarboxylic acid. These monomers may be used to make either the semi-crystalline copolyester resin or the amorphous copolyester resin, with the ratios of the monomers and processing conditions being modified in a known way to make either the semi-crystalline or amorphous copolyester resin.

Turning more specifically to the semi-crystalline copolyester resin of the copolyester resin component, the semi-crystalline copolyester resin may be made from a diol and a diester and a diacid, in a known way. The diols may be selected from ethylene glycol, diethylene glycol, butane diol (1,4-; 1,2-; and 1,3-), neopentyl glycol, 2-methyl-1,3-propane diol, hexane diol, trimethylolpropane, cyclohexanedimethanol, tricyclodecane dimethanol, and mixtures thereof. The diesters may be selected from dimethyl terephthalate and dimethyl isophthalate and mixtures thereof. Finally, the diacids may be selected from terephthalic acid, isophthalic acid, adipic acid, azelaic acid, sebacic acid, cyclohexanedicarboxylic acid, and mixtures thereof. Commercially available extrudable grade copolyester resins are suitable for use as the semi-crystalline copolyester resin this application include Vitel™ 1901NSB, Vitel™ 1904NSB, Vitel™ 1801, Vitel™1912NSB, Vitel™ 1916NSB supplied by Bostik, Inc. or their combinations thereof. These copolyesters provide a smooth peel that is necessary for the consumer to open the package without shredding the lid and spilling the food. Another suitable resin includes Vylon 30P, commercially available from Toyobo. Still other suitable resins include Dow's Mor-ester grades. In another embodiment, the semi-crystalline copolyester resin is made from ethylene glycol, terephthalic acid, sebacic acid, and azelaic acid. In another embodiment, the semi-crystalline copolyester resin is made from ethylene glycol, terephthalic acid, and azelaic acid. In another embodiment, the semi-crystalline copolyester resin is made from ethylene glycol, terephthalic acid, and sebacic acid. Semi-crystalline co-polyester resins are those materials which have a well arranged crystalline phase embedded within the more random amorphous domain. The ordered crystalline sites impart the properties such as toughness and opacity to the resin. Semi-crystalline co-polyester resins have a degree of crystallinity of at least 5% but 30% or less as determined by DSC or equivalent technique, against a highly crystalline polypropylene standard. In an embodiment of the invention, the semicrystalline copolyester resin has a $T_g$ of about −30° C. to about 20° C. (preferably about −15° C. to about 5° C.); a $T_m$ of about 125° C. to about 170° C. (preferably about 135° C. to about 160° C.); a ball and ring melt point of about 110° C. to about 170° C. (preferably about 135° C. to about 160° C.); an intrinsic viscosity of between about 0.85 and about 1.05 dl/g (preferably in the range of about 0.88 to about 1.0 dl/g); and a melt viscosity in the range of about 1,250 to about 3,250 poise (preferably between about 1,600 to about 2,600 poise). (Throughout, all properties of the various constituents are determined consistently, unless noted specifically otherwise.)

In embodiments wherein the copolyester component comprises a mixture of the semi-crystalline copolyester resin and an amorphous copolyester resin, the approximate ratios of the two resins are in the range of 1.5:1 to 30:1, preferably from about 2:1 to about 10:1 and most preferably from about 3:1 to about 8:1. The range of the semi-crystalline copolyester resin component which is present in the fully formulated heat seal resin composition may be in an amount of between about 60% to about 99.9% by weight of the composition, preferably between about 70% to about 99.8%, and most preferably between about 70% to about 80%.

Turning next to the amorphous copolyester resin of the copolyester resin component, the amorphous copolyester resin may be made from one or more diols, diesters, and diacids, in a known way. The diols may be selected from ethylene glycol, diethylene glycol, butane diol (1,4-; 1,2-; and 1,3-), neopentyl glycol, 2-methyl-1,3-propane diol, hexane diol, trimethylolpropane, cyclohexanedimethanol, tricyclodecane dimethanol and mixtures thereof. The diesters may be selected from dimethyl terephthalate and dimethyl isophthalate and mixtures thereof. The diacids may be selected from terephthalic acid, isophthalic acid, adipic acid, azelaic acid, sebacic acid, and cyclohexanedicarboxylic acid, and mixtures thereof. In an embodiment, the amorphous copolyester resin comprises ethylene glycol, neopentyl glycol, terephthalic acid, isophthalic acid, sebacic acid, and azelaic acid. In another embodiment, the amorphous copolyester resin is made from ethylene glycol, neopentyl glycol, terephthalic acid and isophthalic acid. In another embodiment, the amorphous copolyester resin is made from ethylene glycol, neopentyl glycol, terephthalic acid and isophthalic acid, and sebacic acid. In still another embodiment, the amorphous copolyester resin is made from ethylene glycol, neopentyl glycol, terephthalic acid and isophthalic acid, and azelaic acid. In yet a final embodiment, the amorphous copolyester resin is made from ethylene glycol, terephthalic acid and isophthalic acid. Commercially available extrudable grade copolyester resins which are suitable for use as the amorphous copolyester resin this application include amorphous copolyester resins having a high glass transition temperature ($T_g$) in the range of 45° C. to 110° C. such as Vitel™ 2700B, Vitel™ 2200B or Vitel™ 1200B supplied by Bostik, Inc. Another suitable resin includes Vylon RN9300, commercially available from Toyobo. These resins also help to improve the adhesion of the heat seal coating onto APET trays.

As used herein, amorphous co-polyester resins are those resins which are glassy and transparent. They do not have a definite molecular arrangement as the structure is very randomized and intertwined. Based on the glass transition temperature, they can be either tacky or brittle at room temperature. Amorphous co-polyester resin does not have any crystallinity and melting point as determined by DSC or equivalent technique and therefore have an enthalpy of fusion of zero. In an embodiment of the invention, the amorphous copolyester resin has a $T_g$ of about 45° C. to about 110° C. (preferably about 60° C. to about 80° C.); a ball and ring melt point of about 125° C. to about 175° C. (preferably about 140° C. to about 160° C.); an intrinsic viscosity of between about 0.5 and about 0.7 dl/g (preferably in the range of about 0.55 to about 0.65 dl/g); and a melt viscosity in the range of about 1,750 to about 3,750 poise (preferably between about 2,250 to about 3,250 poise). The range of the amorphous copolyester resin component which is present in the composition may be in an amount of between about 5% to about 40% by weight of the composition, preferably between about 10% to about 30%, and most preferably between about 10% to about 25%.

In an exemplary embodiment, the heat seal co-polyester resin is made from a combination of standard polyester diols, such as ethylene glycol, diethylene glycol, butane diol (1,4-; 1,2-; and 1,3-), neopentyl glycol, 2-methyl-1,3-propane diol, hexane diol, trimethylolpropane, cyclohexanedimethanol, tricyclodecane dimethanol and diesters such as dimethyl terephthalate, dimethyl isophthalate or diacids such as terephthalic acid, isophthalic acid, adipic acid, azelaic acid, sebacic acid, and cyclohexanedicarboxylic acid. Such a resin provides consistent seal strength for sealing temperatures as low as 121° C. or low and up to 163° C. or above. The haze % of the films produced by coextrusion was found to be as low as 6.49% and as high as 10.23% for a coat weight of approximately 1.25 pounds/ream (lb/rm). The extruded films had haze as high as 39.28% and as low as 21% for 5.5 lb/rm coat weight. The conditions for extrusion process can be modified to give low haze films that can be used for the application.

The heat seal resin composition also comprises antifog additives to impart the final application property of antifog nature to the PET film. This additive imparts good antifog ability when the film is exposed to either hot fog or cold fog conditions. Any suitable antifog additive can be used and preferably such additive, like the other constituents, are safe for food if the item to be contained is a food item. The antifog additive may be selected from the group consisting of sorbitan esters, glycerol esters, ethoxylated sorbitan ester, and compounds modified with alpha monoglyceride, and mixtures thereof. Several antifog additives provided by Croda Polymer Additives such as Atmer™ 100 (a liquid sorbitan ester), Atmer™ 1440 (a glycerol ester liquid), Atmer™ 1010 (a glycerol ester paste), Atmer™ 116 (an ethoxylated sorbitan ester liquid), can be used. Antifog additives from Lonza, such as Glycolube™ AFA-1 VEG (proprietary antifog which is a viscous opaque oily liquid at 25° C.) and Glycolube™ MO-O-20 (proprietary antifog additive with 20-30% alpha monoglyceride which is a viscous opaque oily liquid at 25° C.) can also be used as antifog additives. Other antifog additives with similar chemistry, performance, and properties can also be used. Preferably, the antifog additive migrates to the surface of the PET film and raises the surface energy of the PET film and lowers the surface energy of the water droplets forming a continuous and uniform transparent layer of water once water condenses on the surface of the PET film. The antifog additive is present in an amount of between about 0.01% to about 5% by weight of the fully formulated heat seal resin composition, preferably about 0.1% to about 5%, and most preferably about 2% to about 5%.

The heat seal resin composition also comprises an anti-block and slip additive. Without the anti-blocking additives, coated flexible substrates would tend to block when wound into roll form and stored prior to use on a form, fill and seal machine. Slip additives serve to impart slip to the film and help to move the film smoothly through the converting and packaging equipment. As used herein, the phrase "an anti-block and slip additive" is used to denote a single constituent that primarily serves to reduce blocking, a single constituent that primarily serves to reduce slip, or a single constituent that adequately performs both functions, or combinations thereof, so long as some level of both reductions in blocking and slip are achieved over a formulation without the constituent(s). Any suitable anti-block and slip additive may be used. The anti-block and slip additive may comprise silica, silicate, and amides, such as fatty amides or polyamides or combinations thereof. The anti-block and slip additive may comprise the amides and the amides have a melting point in the range of 70° C. to 180° C. In one embodiment, the anti-block and slip additive comprises fatty amides having a melting point in the range of 70° C. to 150° C. In another embodiment, the anti-block and slip additive comprises polyamides has a melting point in the range of 150° C. to 180° C. and an average particle size in the range of about 0.5 to about 10 microns. In yet another embodiment, the anti-block and slip additive comprises the silica and the silica has an average particle size in the range of about 0.5 to about 10 microns. In another embodiment of the invention, the silica is a blend of two silica sources consisting of a first source having an average particle size of about 0.5 to about 4 microns and a second source having an average particle size of about 5 to about 10 microns. In a further embodiment, the anti-block and slip additive comprises particles from a first and second source and the first source has an average particle size of about 1.5 to about 4 microns and the second source has an average particle size of about 8 to about 12 microns.

Anti-block and slip additives preferably include a mix of silica (e.g. Sylobloc™ 47—a silica gel antiblocking agent supplied by W.R. Grace & Co. with a particle size of 5.4 to 6.6 microns, Sylysia™ 310P—a silicate supplied by Fuji Silysia Chemical Ltd with a particle size of 1.5 to 4 microns, and Lo-Vel™ 29—a synthetic amorphous precipitated silica supplied by PPG industries with a median particle size of 10 microns) and fatty amides, such as: Crodamide™ ER—slip and antiblock agent supplied by Croda Polymer Additives, a refined erucamide with a melting point of 79° C.; Crodamide™ BR—slip and antiblock agent supplied by Croda Polymer Additives, a refined behenamide with a melting point of 108° C.; Crodamide™ 212 slip and antiblock agent supplied by Croda Polymer Additives, a stearyl erucamide with a melting point of 72.5° C.; or Crodamide™ EBS—slip and antiblock agent supplied by Croda Polymer Additives, an ethylene bis-stearamide with a melting point of 143° C. Fatty amides act as antiblocking agent or external lubricant which improves the flow and release properties of the coated PET film. These amides bloom to the surface and provide the needed antiblocking ability when the film is stored after the coating is manufactured. Also, the addition of polyamides such as Orgasol™ 2001 UD NAT 2 (melting point of 177° C., spheroidal polyamide with a particle size of 5 micron) and Orgasol™ 2002 EXD NAT 1 (melting point of 177° C., spheroidal polyamide with a particle size of 10 micron) provided by Arkema Inc. can also be used as suitable anti-block and slip additives.

The co-polyester monomers as well as the additives used in compounding the heat seal resin are desirably approved for direct food contact. The semi-crystalline co-polyester heat seal resins are found to extrude very easily on to PET films or coextrude with polyester resins to form a heat seal PET film. Hence the semi-crystalline co-polyester heat seal resin provides excellent adhesion to polyester films for use in sealing APET (amorphous polyester) tray stocks. The heat seal resin with a semi-crystalline structure with low glass transition temperature eliminates the tendency of the heat seal coating to creep when the coated packaging film is stored in roll form prior to use on a form, fill and seal packaging machine. It also imparts flexibility, elasticity and strength to the coating A mixer or extruder may be used to make the heat seal resin composition of the present invention. The additives may be extruded using a Leistritz MIC 27 6L/400 twin screw extruder to form the formulated copolyester heat seal resin which can then be coextruded with PET or extrusion coated onto PET film. It is recommended to dry the Vitel® copolyester resins at 68° C. for five hours before the twin screw extrusion process. The following parameters may be used for all the compositions but the pressures may be varied and hence the torque, so they are both represented as a range. The solids may be fed using three solid feeders. Two vibration feeders, one screw feeder, and one liquid port may be used for feeding into the port of the extruder. The feeder rate may be varied to achieve the desired weight percentage of each raw material depending on the formulation. A screw dimension of 27 mm may be used and may be run at a speed of about 200 RPM with a pressure of 650 to 800 psi giving a torque of 72%. The screw zone temperatures may be set at 130, 135, 135, 140, 140, 145, 150, 150, 150, 150° C. for the extrusion process. An extruder temperature may be controlled using a cooler (e.g., AEC cooler from Aqua Poly Equipments Co.) that may be set at 60° C. The heat seal resin hence extruded may be cooled using a water bath, crystallized and chopped to give the solid pellets. Once extruded and chopped, the formulated copolyester resin may be dried and packaged into foil lined bags to be used by the converter.

According to another embodiment of the invention, a method of making a laminate comprises the steps of: forming a heat seal resin composition by mixing a copolyester resin component, an antifog additive, and an anti-block and slip additive in the absence of a solvent; and applying the heat seal resin composition to polyester to form the laminate, wherein no solvent is added to the heat seal resin composition before or during the applying step. Although other methods could be used to apply the heat seal resin composition to the polyester, preferably either coextrusion or extrusion is used.

In one aspect, the invention is directed to a heat seal coated packaging film, to which the heat seal coating is applied on to one face of the film by extrusion process. The film is formed by extruding the formulated heat seal resin at a specific temperature that will help melt the formulated heat seal resin and form a stable curtain which can then adhere to a PET film. This final film has a 100% coverage of the heat seal coating in some embodiments. Normally, the heat seal coating hence formed should have a thickness corresponding to a coating weight of at least 1.0 lb/rm and it can go as high as 5 lb/rm or 10 lb/rm. As used herein, a ream ("rm") has 3,000 square feet. The thickness of the coating is also determined by the temperature of extrusion as well as the line speed and screw speed. The thickness is adjusted based on these parameters to give a coating that is clear, capable of sealing to the tray stock with good bond strength with smooth peels instead of weld seals as well as has good antifog and antiblock ability. Anyone skilled in the art of extrusion would know how to obtain such a coating film.

In another aspect, the invention is directed to a heat seal coated packaging film which is formed by coextruding the formulated heat seal resin along with PET resin to form the extrudate. This extrudate is oriented biaxially to give the final film which acts as the PET substrate to bond to APET trays. In doing so, the film is very clear with the heat seal coating as one of the layers of the film which imparts heat sealability of the film as well as give antifog and antiblock ability to the film. Any one skilled in this art would know how to manufacture such a PET film for use into food packaging. This is described very well in examples like U.S. Pat. Nos. 4,375,494, 7,413,800, 3,371,947, 4,165,210, 6,939,584. Normally, the heat seal coating formed by this technique is lesser in thickness compared to the extrusion coating because of the ability of orienting the film in both directions. The coating weight is at least 1.0 lb/rm. The coating weight is also determined by the temperature of coextrusion as well as the line speed and screw speed. The coating weight is adjusted based on these parameters to give a coating that is clear, capable of sealing to the tray stock with good bond strength imparting smooth peels when the tray is opened, as well as has good antifog and antiblock ability.

Importantly, no primer coating is needed for this heat seal coating to adhere to the commonly used substrate in the packaging industry used to package fresh produce or in general polyethylene terephthalate (PET) to be used as a clear lidding material for food packaging. Proper anchorage to substrates is accomplished by the inclusion of resins that have the ability to adhere to this substrate. Also, corona treatment is helpful to increase surface energy and improve anchorage, if needed during the extrusion process. This treatment usually cleans the surface of the PET film, more than anything, as PET film has high static and tends to have surface dirt.

The flexible PET film hence formed is sealed to an APET container which contains items, such as fresh produce and other refrigeratable foods. This package prevents leakage of food with good package integrity. The seal on to the APET tray can be formed by placing the flexible film on top of the container and applying heat and pressure for a certain amount of time in order to melt and soften the sealable coating layer, helping it to adhere to the APET container. This allows the flexible film to form an easy-peelable seal between the flexible lid stock and the rigid tray stock. The seal is termed easy-peelable, so the lid can be strong enough to hold the food without any leakage but at the same time be easy to open instead of tearing the flexible lid stock resulting from a weld seal. This kind of seal is controlled by proper selection of copolyester resin chemistry as well as being able to adjust a uniform film thickness during the manufacture of the flexible PET film by extrusion or coextrusion process.

As seen in several cases, the coating of the sealable layer is applied to the PET film as a secondary off-line process. W.O. Pat. No. 2014006205 A1, CN 102558978, KR 2006109623 JP 2007031545 US 20130224411 A1 US 2011/0163101 A1 are all examples for this process. This can occur either before, during or between any stretching operations to form the final PET flexible film. The coating usually uses organic solvents or water depending on the chemistry of the coating. These solvents if not completely evaporated can cause sticking or blocking of the film when wound after the film production. Beyond that any solvent retained in the film can be harmful to be used in the next step, when used to package food. Hence proper heating and drying of the film involving longer process time along with expensive equipment is very critical to produce good quality film for the required end-use application. In certain cases, this step can hurt the overall properties of the film, making it brittle and also deteriorate the tensile properties. Hence in-line coating produced without the aid of solvents and which can be processed in a single step would be beneficial to the converter in terms of reducing the steps as well as reducing the use of solvents or completely eliminating it and also reducing the overall time and cost to produce the film.

In practice, converters use either extrusion or coextrusion process to produce the clear PET lidding film. Although this work is specific to extrudable heat seal copolyester resin, any converter capable of handling solvents could also potentially use this product to form the heat sealable PET film. Since the heat seal copolyester resin dissolves in solvents like tetrahydrofuran (THF) or 1,3-dioxolane, the resin can be solvated in these solvents and applied to PET films. This is usually done by supplying a roll of packaging film to a printing press such as a gravure or flexographic printing press. Then, the converter uses the printing press to apply the solvated heat seal coating onto one face of the packaging film. The converter then dries the solvent-based heat seal coating to remove the solvent, for example using conventional in-line drying systems, thereby leaving a dry solid layer of heat seal coating on the packaging film. The converter then rewinds the coated and dried film into roll form for later use on a form, fill and seal packaging machine. As mentioned, it may be necessary to treat packaging film via corona discharge prior to applying the heat seal coating through extrusion process or during printing process in order to assure adequate anchorage of the coating to the packaging film. This treatment usually cleans the surface of the PET film, more than anything, as PET film has high static and tends to have surface dirt.

In accordance with an embodiment of the invention (namely, in a method of making a laminate or making a package for containing an item, such as a food item), the heat seal copolyester resin contains the following ingredients:

a. heat seal polyester resin in an effective amount, such as about 90-95% by weight, b. antifog additives in an effective amount, such as about 0.01-5% by weight, and c. anti-block and slip additives in an effective amount, such as comprising about 0.01-2.5% by weight of silica and about 0.01-2.5% by weight of amides (steryl erucamide, refined erucamide, ethylene bis-stearamide or polyamide etc.).

The weight percentages may vary over a wide range to achieve the purposes of the present invention. According to an embodiment of the invention, the copolyester resin component is present in an amount of between about 80% to about 99% by weight of the composition; the antifog additive is present in an amount of about 0.01% to about 5% by weight of the composition; and the anti-block and slip additive is present in an amount of about 0.01% to about 5% by weight of the composition. According to another embodiment of the invention, the semi-crystalline copolyester resin component is present in an amount of between about 60% to about 99.9% by weight of the composition; and the amorphous copolyester resin is present in an amount of about 5% to about 40% by weight of the composition. According to still another embodiment of the invention, the semi-crystalline copolyester resin component is present in an amount of between about 70% to about 99.8% by weight of the composition; the amorphous copolyester resin is present in an amount of about 10% to about 30% by weight of the composition; the antifog additive is present in an amount of about 0.1% to about 5% by weight of the composition; and the anti-block and slip additive is present in an amount of about 0.1% to about 5% by weight of the composition.

According to yet a further embodiment of the invention, the semi-crystalline copolyester resin component is present in an amount of between about 70% to about 80% by weight of the composition; the amorphous copolyester resin is present in an amount of about 10% to about 25% by weight of the composition; the antifog additive is present in an amount of about 2% to about 5% by weight of the composition; and the anti-block and slip additive is present in an amount of about 0.1% to about 2% by weight of the composition.

In each of the above embodiments, the heat seal resin composition may contain only the constituents identified above, namely the copolyester resin component (either alone or as the sum of the semi-crystalline copolyester resin component and the amorphous copolyester resin component), the antifog additive, and the anti-block and slip additive. In that case, the sum of the weight percentages of these constituents would add to 100%. In some embodiments, additional constituents might be added, such as a solvent, an antioxidant, a dye, a filler, and a uv-fluorescing agent. In such embodiments, the sum of the weight percentages of the three components (i.e., the copolyester resin component, the antifog additive, and the anti-block and slip additive) or the four components (i.e., the semi-crystalline copolyester resin component, the amorphous copolyester resin component, the antifog additive, and the anti-block and slip additive) listed above would be less than 100%.

To give good adhesion to APET trays, this semi-crystalline copolyester resin is used in conjunction with a high $T_g$ copolyester resin in embodiments of the invention. The semi-crystalline nature of the resin is a beneficial feature in that an amorphous resin with a similar low $T_g$ would be prone to cold flow at room temperature and would tend to creep or flow so that the coating integrity would be compromised as the heat seal coated roll is stored. It also helps in providing a very smooth peel of the lid when the PET lid is opened from the APET tray. This will prevent the seal from being a weld seal as well as prevent the lid from shredding.

The listed heat seal copolyester resins are semicrystalline but they are not completely crystallized in time during the conversion into PET films. In other words, these resins are slow crystallizers and it takes about one to six hours for it to fully crystallize in presence of heat, whereas the film conversion takes place within several seconds. The film tends to block severely unless anti-block additives are included in the mixture.

In accordance with the invention, it is desirable that the packaging film on to which the heat seal coating is extruded or the film formed through coextrusion process be suitable for use in the food industry and be listed as FDA direct food compliant, 21 CFR § 175.300, with a condition of use for refrigerated food packaging. For the extrusion process, the copolyester heat seal resin is melt-extruded on to a PET film, which is then quenched and preferable oriented in at least one direction to obtain a heat seal coating having even coating as well as good clarity for the application. This heat seal coated PET film can then be used to seal containers. Where the PET film comprises more than one layer, or where co-extrusion process is beneficial, the different polyester or copolyesters with suitable additives are simultaneously coextruded through independent orifices of a multi-orifice die and thereafter uniting the still molten layers. It can also be accomplished by a single-channel coextrusion in which molten streams of the respective polymers are first united within a channel leading to a die manifold, and thereafter extruded together from the die orifice under conditions of streamline flow without intermixing thereby producing a multilayer polymeric film which can then be oriented and heat set to form a biaxially oriented PET film with one of the layers being the heat seal layer. This layer on the PET film can then be used to seal containers with heat and pressure.

The coating is preferably applied to result in a minimum coat weight of 1.00 lbs./ream and the maximum coat weight of 10 lbs./ream depending on the process. Coextrusion processes usually have the capability of forming very thin heat seal coating layers compared to extrusion coating. Higher coat weights can usually increase the haze and diminish the peel strength on to the container. Also if not needed, it results in higher costs for the convertor. After the coating film is produced either by extrusion or by coextrusion process, the coated web is wound into a roll of heat seal coated film. Once produced, the roll can be slit and used for further processing or packaging.

The heat seal copolyester resin is packaged and shipped to converters in foil-lined bags. The only handling part is to dry the resin well enough to allow for smooth processing of the resin, so that it does not undergo degradation with heat and moisture. A good level for moisture in the formulated heat seal resin would be 0.05% by weight or less.

The co-polyester heat seal resin is preferably a combination of standard polyester diols, such as ethylene glycol, diethylene glycol, butane diol (1,4-; 1,2-; and 1,3-), neopentyl glycol, 2-methyl-1,3-propane diol, hexane diol, trimethylolpropane, cyclohexanedimethanol, tricyclodecane dimethanol and diesters such as dimethyl terephthalate, dimethyl isophthalate or diacids such as terephthalic acid, isophthalic acid, adipic acid, azelaic acid, sebacic acid, and cyclohexanedicarboxylic acid. The overall composition of the heat seal copolyester resin provides excellent anchorage to polyester for extrusion process. It can also be coextruded along with commercial polyester resin to form the final heat seal PET film without any incompatibility or processing issues in the line, this is due to the chemical identity of the resins being extruded. No primer coating is needed to anchor the heat seal coating to a high surface energy PET film during the extrusion process. This anchorage to high surface energy substrate is easily accomplished due to the polar nature of the copolyester resin. Corona treatment of the substrate will also improve the anchorage, if needed. This treatment usually cleans the surface of the PET film, more than anything, as PET film has high static and tends to have surface dirt.

The heat seal coating on the PET film provides excellent sealability to APET trays over a wide range of temperatures. Bond strength in excess of 200 grams per linear inch (gli) is provided at bond sealing temperatures of 121° C. The bond strength is very consistent over the temperature window of application. This consistent bond strength allows the formation of reliable seals at various bonding temperature during the packaging process of form, fill and seal. This property is highly desirable within the packaging industry.

As mentioned above in embodiments of the invention, the copolyester resins used in this invention is a mixture of semi-crystalline and amorphous copolyester resins. A good example would be the use of Vitel™ 1901 co-polyester resin which is semi-crystalline. It has a glass transition temperature of −4 deg C. and a broad melting peak at 125 deg C. (ASTM D7138). It has a ball and ring melt point of about 150° C. The amorphous copolyester used in the invention is Vitel™1200B with a glass transition temperature of 70 deg C. and a ball and ring melt point of 145 deg C. Since it is amorphous, it does not impart any crystallinity to the overall heat seal coating. The two copolyester resins are very compatible and easy to melt and blend in a twin screw extruder along with other additives to whoever is skilled in the art of copolyester resin extrusion. Hence the final base copolyester resin has a combination of semicrystalline and amorphous nature with enough low glass transition temperature to make it flexible without cold flow, elastic, creep-resistant as well as enough strength to form a very stable bond to an APET tray. The coating along with the other additives does not block and have enough slip properties to be able to be handled easily unwound once produced and stored in roll form. It also contains the antifog additives in a suitable combination to impart a PET stock film that is clear, has antifog ability, and gives smooth and consistent peels. The antifog ability of the film does not diminish with storage of the film in roll stock.

Vitel™1901NSB along with Vitel™1200B has been identified as a desirable combination to form the base heat seal copolyester resin. The combination usually consists of about 70-90% of Vitel™1901 and 10 to 30% of Vitel™1200B by weight of the binary combination to give the desired properties. Although this combination has been identified as a preferable embodiment, this may not be restrictive as other combinations and other Vitel® copolyester resins could be used to form the base of the antifog heat seal copolyester resin. Other co-polyester blends with similar thermal properties may be suitable for manufacture of the invention including resins containing the following polyester monomers: diols, such as ethylene glycol, diethylene glycol, butane diol (1,4-; 1,2-; and 1,3-), neopentyl glycol, 2-methyl-1,3-propane diol, hexane diol, trimethylolpropane, cyclohexanedimethanol, tricyclodecane dimethanol and diesters such as dimethyl terephthalate and dimethyl isophthalate and diacids such as, terephthalic acid, isophthalic acid, adipic acid, azelaic acid, sebacic acid, and cyclohexanedicarboxylic acid. The semicrystalline copolyester resins will have a $T_g$ between −30° C. and 0° C., $T_m$ of 100° C. to 160° C. and ball and ring melt point of 70° C. to 160° C. The amorphous copolyesters would have a $T_g$ of 45° C. to 110° C. and a ball and ring melt point of 130° C. to 200° C. The intrinsic viscosity of these copolyester resins can range from 0.5 to 1.0 dl/g.

The heat seal coating formulation described herein is an extrudable copolyester resin intended to be sold to film converters, for example, as a fully formulated dried resin in bags or drums. Since copolyesters have the tendency to absorb moisture over time, it is expected that the converter will dry the fully formulated copolyester resin before subjecting it to extrusion or coextrusion process. Air or vacuum drying at 60° C. (140° F.) for minimum four hours should bring the moisture down to 0.05 weight % or less for the next step.

A suitable combination of additives is desired for good processability of the resin as well as having the desired final properties, including good bond strength, clarity and antifog ability. This was achieved by a combination of the antiblock, slip and antifog additives. A combination of antiblock and slip additives having a suitable particle size is desirable in providing the antiblock and slip nature to the film. It also helped in proper blooming of the additives to the surface of the film without competition between the antiblock and antifog ingredients. The clarity of the film was also not compromised in doing so. It was found that a combination of silica such as Sylobloc™47 and Sylisia™ 310P as well as fatty amides such as Crodamide 212, Crodamide ER, or polyamide such as Orgasol 2001 UD NAT2 provides a smooth and consistent coating. Also a combination of antifog additives such as Atmer 1010 and Atmer 116 is preferable to achieve good antifog properties. These additives were chosen so that they do not undergo any degradation during the twin screw extrusion process for the manufacture of the heat seal copolyester resin, as this is carried out at temperatures as high as 150 deg C. or more.

In sum, the disclosed heat seal copolyester resin composition provides an extrusion or coextrusion coating to give a clear PET film that can be used for packaging foods to be stored in a refrigerator. The PET film containing the heat seal coating on the side in contact with the food is clear, non-blocking and capable of condensing water droplets in such a way as to provide a clean window for the consumer to see the quality of the packaged food without any fogging. The shelf life of the packaged food in APET trays is not compromised as the package is well sealed with the heat seal coated PET film. The processing window for the packaging industry is also good as the package can be sealed at 121° C. to about 163° C. with consistent bond strength using 35 psi pressure and dwell time of about 0.5 seconds. These conditions can be modified depending on the application window of the packaging industry. It can be extrusion coated primer free on to PET film and provide good bond strength to the APET trays. For applications requiring direct food contact, all components of the fully formulated heat seal copolyester resin selected needs to be compliant with FDA regulations as well as EU food contact compliance.

The predominant film used in these applications is a polyester, such as Mylar®. However, the base film may include any plastic material that is suitable for packaging food products. Useful plastics include homopolymers, copolymers, terpolymers, and heteropolymers of one or more of polyolefins, polyamides, polyesters, polyvinyls, polystyrenes, polyurethanes, polycarbonates, including polymers such as ethylene/vinyl alcohol copolymers (EVOH), polyvinylidene chlorides, polyalkylene carbonates, and starch-containing polymers. Ionomer films could also be considered, such as SURLYN® sold DuPont Teijin Films. Plant based or other renewable materials could also be used, for example PEF (polyethylene furanoate), PLA (polylactic acid) or polycaprolactone based polymers. Thus, wherever "polyester film" is used herein, it could be replaced by any of these other films.

The films may for example be cast, extruded, co-extruded, laminated and the like, including orientation (either uniaxially or biaxially) by various methodologies (e.g., blown film, mechanical stretching or the like). Various additives known to one skilled in the art can be present in the respective film layers including the presence of tie layers and the like. Additives include antioxidants and thermal stabilizers, ultraviolet (UV) light stabilizers, pigments and dyes, fillers, delustrants, anti-slip agents, plasticizers, anti-block agents, other processing aids, and the like.

In addition, although single film layer is primarily discussed herein, the "film" to which the heat seal resin composition is applied could be any sort of multi-layer film. For packaging films like these, it is common to use films that have several different layers for different reasons. A three or four layer structure is possible, wherein the top layer is easy to print on, the middle layer is a oxygen barrier, the third layer gives high strength and the fourth layer is our adhesive.

Aspects of the Invention

Aspect 1. A heat seal resin composition for providing a heat seal film on a film, such as a polyester film, comprising:

a copolyester resin component comprising a blend of a semi-crystalline copolyester resin and an amorphous copolyester resin;

an antifog additive; and an anti-block and slip additive.

Aspect 2. The composition of aspect 1, wherein:

the copolyester resin component is present in an amount of between about 80% to about 99% by weight of the composition;

the antifog additive is present in an amount of about 0.01% to about 5% by weight of the composition; and the anti-block and slip additive is present in an amount of about 0.01% to about 5% by weight of the composition.

Aspect 3. The composition of aspect 2, wherein:

the semi-crystalline copolyester resin component is present in an amount of between about 60% to about 99.9% by weight of the composition;

the amorphous copolyester resin is present in an amount of about 5% to about 40% by weight of the composition.

Aspect 4. The composition of aspect 3, wherein:

the semi-crystalline copolyester resin component is present in an amount of between about 70% to about 99.8% by weight of the composition;

the amorphous copolyester resin is present in an amount of about 10% to about 30% by weight of the composition;

the antifog additive is present in an amount of about 0.1% to about 5% by weight of the composition; and the anti-block and slip additive is present in an amount of about 0.1% to about 5% by weight of the composition.

Aspect 5. The composition of aspect 4, wherein:

the semi-crystalline copolyester resin component is present in an amount of between about 70% to about 80% by weight of the composition;

the amorphous copolyester resin is present in an amount of about 10% to about 25% by weight of the composition;

the antifog additive is present in an amount of about 2% to about 5% by weight of the composition; and the anti-block and slip additive is present in an amount of about 0.1% to about 2% by weight of the composition.

Aspect 6. The composition of any of aspects 1-5, wherein the anti-block and slip additive comprises silica and amides.

Aspect 7. The composition of aspect 6, wherein the anti-block and slip additive comprises the amides and the amides comprise fatty amides and polyamides.

Aspect 8. The composition of aspect 7, wherein:

the fatty amides are present in an amount of between about 0.01% to about 1.5% by weight of the composition; and the polyamides are present in an amount of between about 0.001% to about 1.0% by weight of the composition.

Aspect 9. The composition of aspect 7, wherein the anti-block and slip additive comprises the amides and the amides have a melting point in the range of 70° C. to 180° C.

Aspect 10. The composition of aspect 9, wherein the anti-block and slip additive comprises fatty amides having a melting point in the range of 70° C. to 150° C.

Aspect 11. The composition of aspect 9, wherein the anti-block and slip additive comprises polyamides having a melting point in the range of 150° C. to 180° C. and an average particle size in the range of about 0.5 to about 10 microns.

Aspect 12. The composition of aspect 6, wherein the anti-block and slip additive comprises the silica and the silica has an average particle size in the range of about 0.5 to about 10 microns.

Aspect 13. The composition of aspect 12, wherein the silica is a blend of two silica sources consisting of a first source having an average particle size of about 0.5 to about 4 microns and a second source having an average particle size of about 5 to about 10 microns.

Aspect 14. The composition of aspect 12, wherein the first source has an average particle size of about 1.5 to about 4 microns and a second source having an average particle size of about 8 to about 12 microns.

Aspect 15. The composition of any of aspects 1-14, wherein the antifog additive is selected from the group consisting of sorbitan esters, glycerol esters, ethoxylated sorbitan ester, and compounds modified with alpha mono-glyceride, and mixtures thereof.

Aspect 16. The composition of any of aspects 1-15, wherein the heat seal resin composition has:

a low glass transition temperature ($T_g$, ASTM E1356-08) between about −30° C. and about 15° C., preferably in the range of −20° C. to 10° C., and most preferably between about −15° C. to about 0° C.;

a ball and ring melt point (ASTM E28-99) of between about 110° C. and about 170° C., preferably in the range of 120° C. to 160° C. and most preferably between about 130° C. to about 145° C.;

a DSC melt temperature ($T_m$ ASTM D7138) of between about 100° C. and about 170° C., preferably in the range of 120° C. to 150° C., and most preferably in the range of 125° C. to 145° C.;

an intrinsic viscosity (ASTM D5225-14) between about 0.4 and about 1.1 dl/g, preferably in the range of 0.5 to 1.0 dl/g, and most preferably in the range of 0.6 and about 0.8 dl/g; and an apparent melt viscosity between about 5,000 poise and about 30,000 poise determined at 215° C., preferably in the range of 10,000 poise to 25,000 poise, and most preferably in the range of 15,000 poise to 20,000 poise.

Aspect 17. The composition of any of aspects 1-16, wherein:

the semicrystalline copolyester resin has a $T_g$ of about −30° C. to about 0° C., a $T_m$ of about 100° C. to about 160° C., and a ball and ring melt point of about 70° C. to about 160° C.;

the amorphous copolyester has a glass transition temperature ($T_g$) between about 45° C. to about 110° C. and ball and ring melt point of about 130° C. to about 200° C.;

the antifog additive has a $T_g$ in the range of about −64° C. to about 0° C.

the anti-block and slip additive has a $T_m$ between about 70° C. and about 180° C. and an average particle size between about 0.5 to about 10 microns.

Aspect 18. A method of making a laminate comprising the steps of:

forming a heat seal resin composition by mixing a copolyester resin component, an antifog additive, and an anti-block and slip additive in the absence of a solvent;

applying the heat seal resin composition to a film-forming compound, such as polyester, or a film, such as a polyester film, to form the laminate, wherein no solvent is added to the heat seal resin composition before or during the applying step.

Aspect 19. The method of aspect 18, wherein the applying step comprises coextruding the heat seal resin composition with the film-forming compound or the polyester, which is in the form of a resin before the coextrusion step.

Aspect 20. The method of aspect 18, wherein the polyester is in the form of a polyester film and the applying step comprises extruding the heat seal resin composition onto the polyester film.

Aspect 21. The method of aspect 20 further comprising extruding the polyester to provide the polyester film.

Aspect 22. The method of aspect 20, wherein no primer is applied to the polyester film before the heat seal resin composition is applied onto the polyester film.

Aspect 23. The method of any of aspects 18-22 further comprising winding the laminate into a roll form.

Aspect 24. A method of making a laminate consisting essentially of the steps of:

forming a heat seal resin composition by mixing a copolyester resin component, an antifog additive, and an anti-block and slip additive in the absence of a solvent;

applying the heat seal resin composition to a film-forming compound, such as polyester, or to a film, such as a polyester film, to form the laminate, wherein no solvent is added to the heat seal resin composition before or during the applying step.

Aspect 25. A method of making a package for containing an item comprising the steps of:

making a laminate by:

forming a heat seal resin composition by mixing a copolyester resin component, an antifog additive, and an anti-block and slip additive in the absence of a solvent; and applying the heat seal resin composition to a film-forming compound, such as polyester, or a film, such as a polyester film, to form the laminate, wherein no solvent is added to the heat seal resin composition before or during the applying step; and contacting the laminate with an upper lip of a food tray under sufficient heat and pressure to cause the heat seal resin composition to adhere the laminate to the food tray.

The following definitions are provided below:

Definitions

1. High $T_g$ co-polyester resins are those resins which have a glass transition temperature of 30° C. or more as determined by differential scanning calorimetry (DSC).

2. Low $T_g$ co-polyester resins are those resins which have a glass transition temperature lower than 30° C. and below as determined by DSC.

3. Glass transition temperature (abbreviated as $T_g$) is defined as a second order phase transition where an amorphous material becomes glassy and brittle upon cooling below and becomes soft and ductile upon heating.

4. The seal is termed easy-peelable or smooth-peel, so the lid can be strong enough to hold the food without any leakage but at the same time be easy to open instead of tearing the flexible lid stock resulting from a weld seal.

5. Weld seal is the inverse of peelable seal where the opening of the flexible film from the tray can result in the rupture of the film lidstock.

6. Converter is a film manufacturer who can make the PET lidstock film either through extrusion, co-extrusion or solvent coating process.

EXAMPLES

The following examples demonstrate several aspects of certain preferred embodiments of the present invention, and are not to be construed as limitations thereof.

Example 1

Copolyester heat seal coating composition 1: Vitel 1901NSB (or V1901NSB) manufactured by Bostik, Inc is a semi-crystalline copolyester resin with a $T_g$ of −4° C., Tm of 125° C. and a ball and ring melting point of about 150° C. Vitel 1200B (or V1200B) manufactured by Bostik, Inc is an amorphous copolyester resin with a $T_g$ of 70° C. and a ball and ring melting point of about 145° C. The heat seal copolyester comprises of 76.96% by weight of V1901NSB copolyester, 19.24% by weight of V1200B copolyester, 0.63% by weight of Sylisia 310P from Fuji Sylisia with an average particle size of 2.7 m, 0.29% by weight of Orgasol 2001 U D Nat 2 from Arkema, Inc. with an average particle size of 5 m, 1.44% by weight of Atmer 1010 and 1.44% by weight of Atmer 116, both Atmers provided by Croda. The components were mixed using an extruder and pelletized. The heat seal resin hence extruded was cooled using a water bath, crystallized and chopped to give the solid pellets. The pellets are then dried and packaged to be used either for extrusion or coextrusion process. The physical properties of the heat seal copolyester resin 1 are provided in the table 1. All of the examples cited in the invention were coextruded and some of them were extrusion coated on to 48 gauge PET film. The properties of the film produced using the examples are given in table 2 and 3. As can be seen from the examples, coextrusion process gave better clarity as well as good antifog properties compared to the extrusion process. There was better control of coat weight using the coextrusion process than the extrusion process. The coat weight of the heat seal coating that contained the antifog produced by coextrusion could be as low as 1.0 to 2 lb/rm whereas the coat weight through extrusion process was mostly close to 5 to 9 lb/rm. It was found that modifying the extrusion temperature, the clarity of the film got better. It can also be understood that using a smooth impression roller as well as by controlling the pressure, as well as the screw speed of the extruder, one can control the coat weight and hence the clarity can be improved. By stream lining the extrusion process by one skilled in the art, it is possible that we can achieve good clarity for the extruded film. Antifog properties were very good for coextrusion process and good for extrusion process. Again, higher heat seal coating weights are not required for this application and it actually impaired the final properties of the film, including clarity, bond strength as well as antifog ability. Again, producing even film with good control of coat weight is very important in achieving good clarity and good antifog properties.

Example 2

Copolyester heat seal coating composition 2: The heat seal copolyester comprises of 76.79% by weight of V1901NSB copolyester, 19.22% by weight of V1200B copolyester, 0.84% by weight of Sylobloc 47 from W. R. Grace & Co. with an average particle size of 6 m, 0.28% by weight of Orgasol 2001 U D Nat 2 from Arkema, Inc., 1.43% by weight of Atmer 1010 and 1.43% by weight of Atmer 116, both Atmers provided by Croda. The components are twin screw extruded using Leistritz MIC 27

6L/400 equipment as described above. The physical properties of the heat seal copolyester resin 2 are provided in the table 1.

Example 3

Copolyester heat seal coating composition 3: The heat seal copolyester comprises of 76.69% by weight of V1901NSB copolyester, 19.18% by weight of V1200B copolyester, 0.37% by weight of Sylobloc 47 from W. R. Grace & Co, 0.36% by weight of Sylisia 310P from Fuji Sylisia, 0.44% by weight of Crodamide ER from Croda, 1.48% by weight of Atmer 1010 and 1.48% by weight of Atmer 116, both Atmers provided by Croda. The components are twin screw extruded using Leistritz MIC 27 6L/400 equipment as described above. The physical properties of the heat seal copolyester resin 3 are provided in the table 1.

Example 4

Copolyester heat seal coating composition 4: The heat seal copolyester comprises of 75.7% by weight of V1901NSB copolyester, 18.92% by weight of V1200B copolyester, 0.66% by weight of Sylobloc 47 from W. R. Grace & Co, 0.52% by weight of Sylisia 310P from Fuji Sylisia, 1.2% by weight of Crodamide ER from Croda, 1.5% by weight of Atmer 1010 and 1.5% by weight of Atmer 116, both Atmers provided by Croda. The components are twin screw extruded using Leistritz MIC 27 6L/400 equipment as described above. The physical properties of the heat seal copolyester resin 4 are provided in the table 1.

Example 5

Copolyester heat seal coating composition 5: The heat seal copolyester comprises of 75.65% by weight of V1901NSB copolyester, 18.91% by weight of V1200B copolyester, 0.65% by weight of Sylobloc 47 from W. R. Grace & Co, 0.51% by weight of Sylisia 310P from Fuji Sylisia, 0.88% by weight of Crodamide ER and 0.4% by weight of Crodamide 212 from Croda, 1.5% by weight of Atmer 1010 and 1.5% by weight of Atmer 116, both Atmers provided by Croda. The components are twin screw extruded using Leistritz MIC 27 6L/400 equipment as described above. The physical properties of the heat seal copolyester resin 5 are provided in the table 1.

Example 6

Copolyester heat seal coating composition 6: The heat seal copolyester comprises of 75.65% by weight of V1901NSB copolyester, 18.91% by weight of V1200B copolyester, 0.65% by weight of Sylobloc 47 from W. R. Grace & Co, 0.51% by weight of Sylisia 310P from Fuji Sylisia, 0.4% by weight of Crodamide ER and 0.88% by weight of Crodamide 212 from Croda, 1.5% by weight of Atmer 1010 and 1.5% by weight of Atmer 116, both Atmers provided by Croda. The components are twin screw extruded using Leistritz MIC 27 6L/400 equipment as described above. The physical properties of the heat seal copolyester resin 6 are provided in the table 1.

Example 7 is a commercial grade Vitel™1916NSB that does not contain any antifog within the formulation. This was taken as a comparison product to determine the antifog properties of the films produced using the above examples that contained antifog (1-6).

Coefficient of Friction (COF) testing: To maintain a good winding performance, a heat seal packaging film was tested for COF in an Instron Model 5982 tester following ASTM D1894 method. The COF is recorded in Table 2. The data suggests good slip property or ease of winding into a roll.

Blocking test: The blocking test was conducted in an I.C. Block Tester made by Koehler. The testing samples (triplicates) were prepared by placing 2 inch×2 inch samples on the block tester. The samples were aligned such that, one sample had the heat seal coated side of the PET film facing up and against the non-coated side of the second PET film that was on top of it. 3 such sets from each example were placed on the block tester. A 10 psi (pounds per square inch) pressure was applied to the film samples. The block tester containing the samples were put into an oven at 50° C. for 16 hours. The block tester was taken out of the oven and conditioned to ambient. A peel test was conducted on the compressed samples and the peel strength values of 50 gli or below is considered as passing, or non-blocking. All samples showed less than 50 gli for the blocking test.

Haze test: The haze % of the film was measured using Konica Minolta CM-3700A spectrophotometer in the transmittance mode. OnColor software was used for the testing. The values were recorded as a haze % using the CIELab color spectrum. A standard which was a clear PET film without any coating on the film was used. Test samples were run after calibration and standardization of the instrument.

Heat seal: The heat seal was conducted on a Gradient heat seal tester, Model GHS-03 manufactured by Labthink International, Inc., Medford, MA. Heat seal pressure was 35 psi and the dwell time was 0.5 second (ASTM F88). The heat seals were made with heat seal coating facing the APET tray stock. The APET tray stock selected for this study was a silicone treated 0.025 inch thick tray stock. Two sealing temperatures were selected for the current study. The temperature for sealing were 121 deg C. and 163 deg C. This does not limit the conditions of sealing, and are not to be construed as limitations thereof. Once sealed, the samples were conditioned at room temperature (25 C and 32% RH) for 24 hrs. The testing data at the two different seal conditions are reported in table 2.

Bond strength test: The adhesion test or bond strength test is conducted in Instron 5543 following ASTM D903. The testing was conducted at room temperature (25 C and 32% RH). The peel speed is 12 in/minutes. The peel strength values are listed in table 2.

Coat weight test: The coat weight of the coated film was tested using ASTM F2217. The solvent used for complete removal of the coating was tetrahydrofuran.

Antifog test: The antifog effectiveness of the PET film produced using the heat seal coating was assessed by the following method. Cold fog: Clear APET trays 2 inch tall were used for the testing. A white paper towel was laid in the inside of the tray and it was filled with 30 mL of distilled water at room temperature. The paper towel would hold the water and prevented the water from being spilled when the tray was sealed or moved around to be placed in the refrigerator. The lip of the tray was about ¼ inch. The APET tray was placed inside a silicone mold for proper alignment during sealing. PET film about 4 inch in diameter containing the heat seal coating was then laid face down on the tray, meaning the heat seal coating faced the inside of the tray. The PET film was then sealed to the tray using a low temperature press at 150° C. to get a very good seal. The pressure on the press was about 40 psi. Dwell time was 1 sec. A picture of the tray after sealing was taken to represent time zero point. See FIG. 1. The sealed tray is placed in a refrigerator at 6° C. (43° F.). The antifog property of the film is then assessed after 30 min, 1 hour, 2 hour, up to 24 (1 day) to 96 hours (4 days) and about 20 days. Each time, pictures were taken for comparison. Representative pictures are shown in FIG. 2 for samples tested at 24 hr. All samples containing antifog coating remaining clear compared to sample 7 which did not contain any antifog additives. Hot fog: Glass jar containing 50% internal volume of water was covered with the PET film containing the heat seal antifog coating face down on top of the jar. Rubber bands were used to secure the film to the jar. The water in the jar was then warmed to 70 deg C. using a water bath for 2 minutes and up to 30 minutes. The antifog ability of the films were then assessed by visual inspection. The hot fog ability of the films looked very good with mostly clear medium sized drops. The PET film without antifog heat seal coating fogged immediately with fine foggy drops. Pictures are not included for the hot fog test.

This application discloses several numerical ranges and values in text. The numerical ranges and values disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the scope and spirit of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

TABLE 1

| Sample Units | $T_g{}^a$ ° C. | Ball & ring $^b$ ° C. | $T_m{}^c$ ° C. | $IV^d$ Dl/g | moisture$^e$ % by weight |
|---|---|---|---|---|---|
| Sample 1 | −7.0 | 146 | 136 | 0.82 | 0.04 |
| Sample 2 | −9.24 | 147 | 139 | 0.76 | 0.01 |
| Sample 3 | −8.6 | 147 | 137 | 0.78 | 0.01 |
| Sample 4 | −8.7 | 150 | 115 | 0.76 | 0.05 |
| Sample 5 | −7.86 | 147 | 134 | 0.77 | 0.01 |
| Sample 6 | −8.4 | 147 | 133 | 0.77 | 0.02 |
| Sample 7 | −4.0 | 141 | 136 | 0.83 | 0.02 |

$^a$Glass transition temperature determined by ASTM E1356-08
$^b$ Ball and ring softening point determined by ASTM E28-99
$^c$Melting point determined by ASTM D7138 using DSC
$^d$Intrinsic viscosity determined by ASTM D5225-14
$^e$% moisture by weight determined using a Computrac moisture determination equipment by heating the solid pellets at 110° C. to constant weight

TABLE 2

Properties of coextruded PET film using the above samples

| Sample | COF-dynamic$^f$ | Haze %$^g$ | Bond strength$^h$ gli 121 degC | Bond strength$^h$ gli 163 degC | Coat weight$^i$ lb/rm |
|---|---|---|---|---|---|
| Sample 1 | 2.05 | 6.49 | 473 | 838 | 1.15 |
| Sample 2 | 0.39 | 6.6 | 625 | 747 | 1.21 |
| Sample 3 | 0.21 | 7.47 | 620 | 653 | 1.25 |
| Sample 4 | | 8.85 | 537 | 817 | 1.26 |

TABLE 2-continued

Properties of coextruded PET film using the above samples

| Sample | COF-dynamic[f] | Haze %[g] | Bond strength[h] gli 121 degC | Bond strength[h] gli 163 degC | Coat weight[i] lb/rm |
|---|---|---|---|---|---|
| Sample 5 | | 7.33 | 483 | 831 | 1.26 |
| Sample 6 | | 10.23 | 722 | 734 | 1.27 |

[f]Dynamic friction reported based on testing conducted referencing ASTM D1894
[g]Haze % tested as described in the text
[h]Bond strength conducted per ASTM D903 at 121° C. and 163° C. and reported as grams per linear inch (gli)
[i]Coat weight tested using ASTM F2217 and reported as pound per ream (lb/rm)

TABLE 3

Properties of extrusion coated PET films

| Sample | Extrusion temp ° C. | Extrusion screw speed rpm | Haze % | Bond strength[h] gli 121° C. | Bond strength[h] gli 163° C. | Coat weight[i] lb/rm |
|---|---|---|---|---|---|---|
| Sample 5a | 176 | 235 | 39.28 | 1036 | 1662 | 5.87 |
| Sample 5b | 190 | 385 | 21.7 | No bond | 200 | 9.01 |
| Sample 6a | 176 | 235 | 50.84 | 778 | 1050 | 5.43 |
| Sample 6b | 190 | 385 | 24.69 | 1119 | 1252 | 6.56 |
| Sample 7 | 198 | | 14 | 1323 | | 5.0 |

I claim:

1. A laminate comprising a polyester resin film and a heat sealable film wherein the heat sealable film comprises about 0.1 to about 5 wt % of an antifog additive, wherein the heat sealable film is formed from a copolyester mixture comprising 70% to 99.8% by weight of a semi-crystalline copolyester resin component.

2. The laminate of claim 1 having excellent clarity and good antifog exhibiting a haze % as described herein of no more than 10.23.

3. The laminate of claim 1 wherein the laminate comprises a clear heat sealable polyester lidding film.

4. The laminate of claim 1 wherein a surface of the heat sealable film comprises a hydrophilic surface.

5. The laminate according to claim 1 wherein the heat sealable film has a thickness corresponding to a coating weight of at least about 1.0 lb/ream up to about 10.0 lb/ream.

6. The laminate according to claim 1 wherein the laminate has a bond strength in excess of about 200 grams per linear inch at bond sealing temperatures of 121° C.

7. The laminate according to claim 1 wherein the copolyester mixture of the heat sealable film further comprises about 10% to about 30% by weight of an amorphous copolyester resin.

8. The laminate of claim 1 capable of being sealed at a temperature of about 121° C. to about 163° C.

9. A laminate comprising a polyester resin film and a heat sealable film wherein the heat sealable film comprises a hydrophilic surface, wherein the heat sealable film is formed from a copolyester mixture comprising 70% to 99.8% by weight of a semi-crystalline copolyester resin component.

10. The laminate according to claim 9 wherein the heat sealable film having a thickness corresponding to a coating weight of up to 10 pounds/ream.

11. The laminate of claim 9 comprises a biaxially oriented film.

12. The laminate of claim 9 capable of exhibiting a bond strength in excess of about 200 grams per linear inch at bond sealing temperatures of 121° C.

13. The laminate of claim 9 capable of being sealed at a temperature of about 121° C. to about 163° C.

14. The laminate of claim 9 wherein the heat sealable film comprises an antifog additive.

15. The laminate of claim 9 wherein the heat sealable film is devoid of an antifog coating.

16. The laminate according to claim 9 having excellent clarity and good antifog exhibiting a haze % as described herein of no more than 10.23.

17. The laminate of claim 9 wherein the laminate comprises a clear heat sealable polyester lidding film.

18. The laminate according to claim 9 wherein the heat sealable film has a thickness corresponding to a coating weight of at least about 1.0 lb/ream up to about 10.0 lb/ream.

19. The laminate according to claim 9 wherein the copolyester mixture of the heat sealable film further comprises about 10% to about 30% by weight of an amorphous copolyester resin.

* * * * *